(12) United States Patent
Brady et al.

(10) Patent No.: US 12,352,218 B2
(45) Date of Patent: Jul. 8, 2025

(54) FUEL SUPPLY SYSTEM FOR A COMBUSTOR

(71) Applicants: GENERAL ELECTRIC COMPANY, Schenectady, NY (US); GE Avio S.r.l., Rivalta di Torino (IT)

(72) Inventors: David Justin Brady, Lynn, MA (US); Mirko Gernone, Mari (IT); Michael A. Benjamin, Cincinnati, OH (US); Steven C. Vise, West Chester, OH (US)

(73) Assignee: General Electric Company, Evendale, OH (US)

( * ) Notice: Subject to any disclaimer, the term of this patent is extended or adjusted under 35 U.S.C. 154(b) by 54 days.

(21) Appl. No.: 17/590,472

(22) Filed: Feb. 1, 2022

(65) Prior Publication Data

US 2023/0243311 A1    Aug. 3, 2023

(51) Int. Cl.
| | |
|---|---|
| F02C 9/40 | (2006.01) |
| F02C 3/22 | (2006.01) |
| F02C 7/22 | (2006.01) |
| F02C 7/224 | (2006.01) |
| F23R 3/30 | (2006.01) |
| F23R 3/36 | (2006.01) |

(52) U.S. Cl.
CPC ............ *F02C 9/40* (2013.01); *F02C 3/22* (2013.01); *F02C 7/22* (2013.01); *F02C 7/224* (2013.01); *F23R 3/30* (2013.01); *F23R 3/36* (2013.01); *F05D 2220/32* (2013.01); *F05D 2240/36* (2013.01)

(58) Field of Classification Search
CPC .... F02C 3/22; F02C 7/22; F02C 7/224; F02C 7/236; F02C 9/40; F05D 2240/36; F23K 5/18; F23K 5/22; F23K 2300/205; F23K 2900/05082; F23R 3/30; F23R 3/36
See application file for complete search history.

(56) References Cited

U.S. PATENT DOCUMENTS

| | | | |
|---|---|---|---|
| 5,771,946 A | 6/1998 | Kooy et al. | |
| 9,752,728 B2 | 9/2017 | Tang et al. | |
| 9,850,195 B2 | 12/2017 | Sang | |
| 10,989,117 B2 | 4/2021 | Roberge | |

(Continued)

FOREIGN PATENT DOCUMENTS

| | | |
|---|---|---|
| DE | 4445183 A1 | 9/1995 |
| FR | 2615903 A1 | 12/1988 |

(Continued)

OTHER PUBLICATIONS

English translation of WO2021240106 (Year: 2021).*

(Continued)

*Primary Examiner* — Scott J Walthour
(74) *Attorney, Agent, or Firm* — McGarry Bair PC

(57) ABSTRACT

A fuel supply system for a combustion section of a turbine engine. The turbine engine including a heat source. The fuel supply system comprising a first fuel supply having a liquid fuel, a second fuel supply having a first gaseous fuel, and a heat exchanger fluidly coupled to the first fuel supply and the heat source. The heat exchanger producing a heat sufficient to change the liquid fuel to a second gaseous fuel that is the same type of fuel as the first gaseous fuel.

20 Claims, 3 Drawing Sheets

(56) References Cited

U.S. PATENT DOCUMENTS

| | | | |
|---|---|---|---|
| 2011/0162343 A1* | 7/2011 | Ouellet | F02C 9/40 |
| | | | 60/39.281 |
| 2012/0232768 A1* | 9/2012 | Nenmeni | F02C 7/232 |
| | | | 701/99 |
| 2015/0121905 A1 | 5/2015 | Watts | |
| 2018/0346313 A1 | 12/2018 | Feng et al. | |
| 2020/0080480 A1* | 3/2020 | Horikawa | F02C 7/228 |
| 2020/0088098 A1* | 3/2020 | Roberge | F02C 7/16 |
| 2020/0088099 A1* | 3/2020 | Roberge | F02C 7/224 |
| 2021/0095599 A1* | 4/2021 | Asai | F02C 9/263 |

FOREIGN PATENT DOCUMENTS

| | | | | |
|---|---|---|---|---|
| FR | 3094070 A1 | | 9/2020 | |
| FR | 3110937 A1 | | 12/2021 | |
| WO | 2016102638 A1 | | 6/2016 | |
| WO | WO-2021240106 A1 | * | 12/2021 | |
| WO | WO-2022023648 A1 | * | 2/2022 | F02C 3/20 |

OTHER PUBLICATIONS

English translation of WO2022023648 (Year: 2022).*
U.S. Appl. No. 63/257,714, filed Oct. 20, 2021 entitled Hydrogen Fuel System.

* cited by examiner

FUEL SUPPLY SYSTEM FOR A COMBUSTOR

TECHNICAL FIELD

The disclosure generally relates to a fuel supply system for a combustor, specifically a fuel supply system for a combustor of a turbine engine.

BACKGROUND

A gas turbine engine includes a turbine that is driven by combustion of a combustible fuel within a combustor of the engine. A turbine engine utilizes a fuel injector assembly to inject the combustible fuel into the combustor. The fuel injector assembly can mix the fuel with air prior to injection in order to achieve efficient combustion. The fuel combustor is fluidly coupled to a fuel supply system having a single liquid fuel source.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
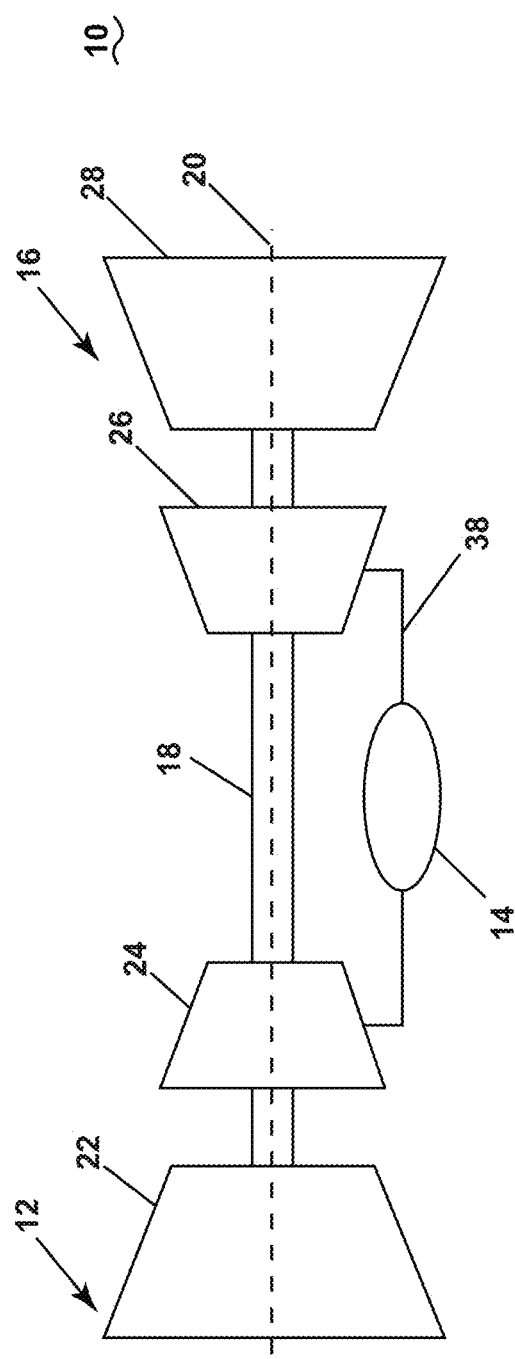
FIG. 1 is a schematic cross-sectional diagram of a turbine engine for an aircraft, the turbine engine including a combustion section.

Aspects of the disclosure described herein are related to a fuel supply system for a combustion section of a turbine engine having a heat source. The fuel supply system can include a first fuel supply having a liquid fuel, a second fuel supply having a first gaseous fuel, and a heat exchanger thermally coupled to the heat source and fluidly coupled to the first fuel supply. As used herein, the term "heat exchanger", or iterations thereof, can refer to any suitable heat exchanger configured to transfer heat from one fluid to another fluid. The heat exchanger can produce enough heat to transition to the liquid fuel to a second gaseous fuel. The fuel supply system can further include a third fuel supply with a third gaseous fuel, a prime fuel line, and a purge fuel line. The prime fuel line can fluidly couple at least one of the second fuel supply or the third fuel supply to the combustion section. The purge fuel line can fluidly couple at least one of the first gaseous fuel, the second gaseous fuel, the third gaseous fuel, the liquid fuel, or any combination thereof to an exterior portion of the fuel supply system. The liquid fuel, the first gaseous fuel, and the second gaseous fuel can be a fuel that can contain hydrogen (hereinafter, hydrogen-containing fuel) that can be stored as a liquid fuel.

The fuel supply system can provide for a combustion fuel flow containing a hydrogen-containing fuel that is supplied to the combustion section. Hydrogen-containing fuels, when compared to conventional fuels, have less of an environmental impact without sacrificing engine performance. The fuel supply system can ensure that a hydrogen-containing fuel can be used for combustion in the combustion section of the turbine engine. Conventional fuel supply systems, which include the conventional fuels, would not be suitable for hydrogen-containing fuels. Further, the fuel supply system can provide for a system which uses waste heat to at least partially operate. The heat exchanger of the fuel supply system can recover at least some of the waste heat from the exhaust section in order to thermally couple the liquid fuel to a heat source sufficient to induce a phase change into the second gaseous fuel. Conventional fuel supply systems do not use waste heat.

For purposes of illustration, the present disclosure will be described with respect to the turbine for an aircraft turbine engine. It will be understood, however, that aspects of the disclosure described herein are not so limited and may have general applicability within an engine, including compressors, power generation turbines, as well as in non-aircraft applications, such as other mobile applications and non-mobile industrial, commercial, and residential applications.

Reference will now be made in detail to the combustor architecture, and in particular the fuel injector and swirler for providing fuel to the combustor located within a turbine engine, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The singular forms "a", "an", and "the" include plural references unless the context clearly dictates otherwise. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary. The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, Digital Versatile Discs (DVDs), Compact Disc-Read Only Memory (CD-ROMs), etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
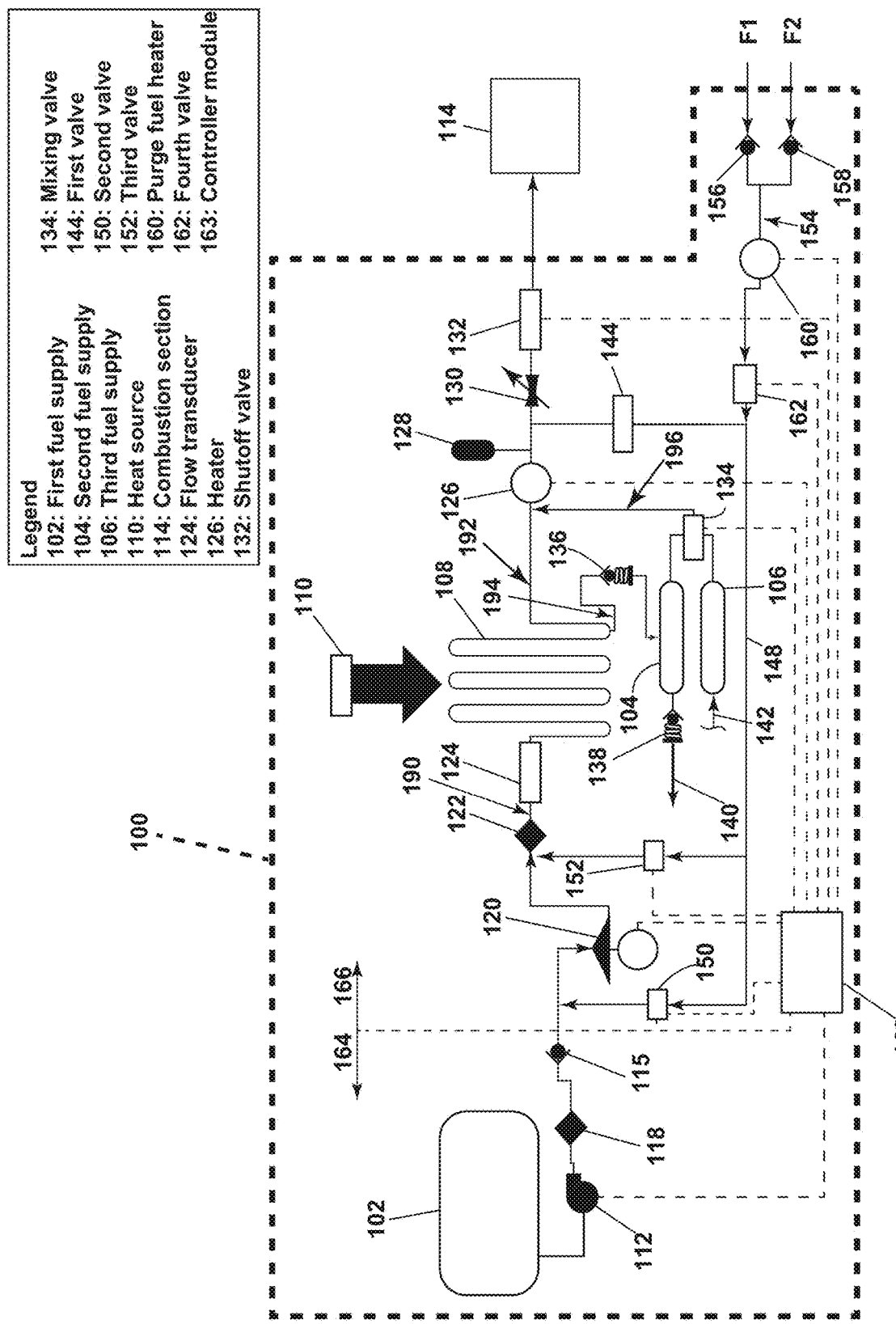
FIG. 2 is a schematic representation of a fuel supply system suitable for use as a fuel supply for the combustion section of FIG. 1, the fuel supply system having at least a first fuel supply and a second fuel supply.

FIG. 2 is a schematic representation of a fuel supply system 100 suitable for use as a fuel supply for a generic combustion section 114 such as the combustion section 14 of FIG. 1. The fuel supply system 100 can include a first fuel supply 102, a second fuel supply 104, a third fuel supply 106, and a heat exchanger 108. The fuel supply system 100 can include a combustion fuel flow that flows through the fuel supply system and ultimately into the combustion section or out of the fuel supply system 100. As used herein, the term "combustion fuel flow" can include any suitable fluid from the first fuel supply, the second fuel supply, the third fuel supply, from another fuel or fluid source, or any combination thereof. The combustion fuel flow in one portion of the fuel supply system 100 can be different from the combustion fuel flow in another portion of the fuel supply system.

A heat source 110 can be thermally coupled to the heat exchanger 108. The heat source 110 can be a heat source from any component or process fluid flow of the turbine engine 10 (FIG. 1). For example, the heat source 110 can be, but not limited to, an exhaust fluid from a downstream portion of the turbine section 16 (FIG. 1). As a non-limiting example, the heat source 110 can be defined as a mixture of heat sources or fluids. As a non-limiting example, the heat source 110 can be defined as a fluid mixture of exhaust gases and ambient air, which is redirected to the exhaust section and exhausted form the turbine engine after it is thermally coupled to the heat exchanger 108.

The fuel supplies 102, 104, 106 can contain the same or different fuel types in the same or different phases (solid, liquid, gas). In one non-limiting example, the first fuel supply 102 can contain a liquid fuel. The liquid fuel can be a liquid, hydrogen-containing fuel. As a non-limiting example, the liquid fuel can be a pure hydrogen cryogenically frozen liquid fuel. The second fuel supply 104 can contain a second gaseous fuel. The fuel type in the second fuel supply 104 is the same fuel type in the first fuel supply 102. As a non-limiting example, both can be a hydrogen-containing fuel in different phases (e.g., the first fuel supply 102 is a liquid hydrogen, the second fuel supply 104 is a gaseous hydrogen). The first fuel supply 102 can be fluidly coupled to the heat exchanger 108. The heat source 110 can heat the liquid fuel as it flows through the heat exchanger 108 and transition the liquid fuel into a second gaseous fuel that flows out of the heat exchanger 108. The first gaseous fuel and the second gaseous fuel can each be hydrogen-containing fuel. The first gaseous fuel can have a first gaseous hydrogen content. The second gaseous fuel can have second gaseous hydrogen content equal to the first gaseous hydrogen content. Alternatively, the first gaseous hydrogen content and the second gaseous hydrogen content can be non-equal. The third fuel supply 106 can have a third gaseous fuel. As a non-limiting example, the third gaseous fuel can any other suitable gaseous fuel that is not hydrogen. As a non-limiting example, the third gaseous fuel can be propane, methane, an inert gas (e.g., a gaseous nitrogen), or any combination thereof. It is contemplated that the first gaseous fuel, the second gaseous fuel, the third gaseous fuel, or a combination thereof, can define the combustion fuel flow that flows into the combustion section 114.

The combustion fuel flow can change based on the operational state of the turbine engine. As a non-limiting example, during startup, the first gaseous fuel, the third gaseous fuel, or a combination thereof can be supplied to the combustion section 114 and ignited, thereby starting the engine. During normal operation (e.g., after startup), the liquid fuel can be supplied to the heat exchanger where a phase change from liquid to gas occurs (e.g., the second gaseous fuel). The second gaseous fuel can be supplied to the combustion section 114 and ignited. At least a portion of the second gaseous fuel can be supplied to the second fuel supply 104 to refill the second fuel supply 104. During shutdown, the first gaseous fuel, the third gaseous fuel, or a combination thereof can define the combustion fuel flow and purge the fuel supply system 100 of any residual combustion fuel flow.

The fuel supply system 100 can include a first fuel pump 112 fluidly coupled to the first fuel supply 102, and a first check valve 115. The first fuel pump 112 can feed the liquid fuel into the first check valve 115. The first check valve 115 can be biased against a portion of the fuel supply system 100 downstream of the first check valve 115 such that the combustion fuel flow cannot backflow into the first filter 118 or the first fuel pump 112.

A second fuel pump 120 can pump the liquid fuel from the first check valve 115 into the heat exchanger 108. The second fuel pump 120 and the first fuel pump 112 can be any suitable pump.

The fuel supply system 100 can include a set of filters along various portions of the fuel supply system 100. The set of filters can be configured to remove particulate matter or other contaminants that are undesirable to enter the combustion section 114 from a respective combustion fuel flow that flows through the filter. As a non-limiting example, the set of filters can include a first filter downstream of the first fuel pump 112 and upstream of the first check valve 115, and a second filter 122 provided downstream of the second fuel pump 120 and upstream of the heat exchanger 108. The first fuel pump 112 and the second fuel pump 120 can be driven by any suitable method.

A flow transducer 124 can be provided within the fuel supply system 100. As a non-limiting example, the flow transducer 124 can be provided upstream the heat exchanger 108 and downstream of the second filter 122. The flow transducer 124 can be configured to measure a mass flow rate of the flow of combustion fuel within the respective portion of the fuel supply system 100. It will be appreciated, however, that the flow transducer 124 can be provided within any suitable portion of the fuel supply system 100 in a location that where it can measure the mass flow rate of the flow of combustion fuel through the respective portion of the fuel supply system 100.

A heater 126 can be provided downstream of the heat exchanger 108. The heater 126 can be used to heat the combustion fuel flow exiting the heat exchanger 108 to a desired temperature. The heater 126 can be any suitable heater. As a non-limiting example, the heater 126 can be a trim vaporizer.

An accumulator 128 can be provided downstream of the heater 126. The accumulator 128 can be configured as a pressure storage vessel that can pressurize the combustion fuel flow within the fuel supply system 100. The accumulator 128 can be any suitable accumulator such as a hydraulic accumulator that is held under pressure by an external force (e.g., the turbine engine 10, a weight, a spring, etc.).

A set of valves can be provided downstream of the accumulator and upstream of just prior to the combustion section. As a non-limiting example, the set of valves can include a flow metering valve 130 and shutoff valve 132. The flow metering valve 130 can be used to limit or otherwise control a mass flow rate of the combustion fuel flow. The flow metering valve 130 can further be used to restrict or pressurize the combustion fuel flow. The shutoff valve 132 can be used to stop the combustion fuel flow into the combustion section 114.

The second fuel supply 104 can be fluidly coupled to a portion at a downstream end of or downstream of the heat exchanger 108. As a non-limiting example, the second fuel supply 104 can be fluidly coupled to a portion of the fuel supply system 100 that includes the second gaseous fuel when the liquid fuel is supplied to the heat exchanger 108. A first pressure release valve 136 can be provided between the heat exchanger 108 and the second fuel supply 104. The first pressure release valve 136 can be biased against a combustion fuel flow from the second fuel supply 104 such that the combustion fuel flow from a downstream portion of the heat exchanger 108 (e.g., a gaseous fuel) can flow through the first pressure release valve 136 and into the second fuel supply 104. As such, the second fuel supply 104 can be filled or refilled by the combustion fuel flow within the fuel supply system 100. As a non-limiting example, the second gaseous fuel can refill the second fuel supply 104. As such, the second fuel supply 104 can be defined as a fuel supply having the first gaseous fuel, the second gaseous fuel, or a combination thereof.

A second pressure release valve 138 can be fluidly coupled to the second fuel supply 104 downstream of the first pressure release valve 136. The combustion fuel flow exiting the second pressure release valve 138 can define an exhaust fluid flow 140. As a non-limiting example, the exhaust fluid flow 140 can be directed toward a downstream portion of the turbine engine (e.g., the turbine section 16, or an exhaust section downstream of the turbine section 16), or directly to atmosphere. The second pressure release valve 138 can be against the exhaust fluid flow 140. The first pressure release valve 136 and the second pressure release valve 138 can each open or otherwise permit the combustion fuel flow to pass through the respective valve when a pressure of the combustion fuel flow upstream of the respective release valve exceeds a predetermined threshold pressure. As such, the second pressure release valve 138 can open, or permit a combustion fuel flow from the second fuel supply 104 to be exhausted through the exhaust fluid flow 140 when the pressure of the gaseous fuel within the second fuel supply 104 reaches or exceeds a predetermined pressure threshold. As a non-limiting example, the first pressure release valve 136 and the second pressure release valve 138 can be spring check valves.

A mixing valve 134 can selectively fluidly couple the second fuel supply 104 and the third fuel supply 106 to define a gaseous mixture of the first gaseous fuel and the third gaseous fuel. The mixing valve 134 can be fluidly coupled a portion of the fuel supply system 100 downstream of the heat exchanger 108. As a non-limiting example, the mixing valve 134 can be fluidly coupled to a portion of the fuel supply system 100 downstream of the heat exchanger 108 and upstream of the heater 126. The mixing valve 134 can selectively fluidly supply the gaseous mixture to a portion of the fuel supply system 100. As described herein, the first gaseous fuel can be a gaseous hydrogen, while the third gaseous fuel can be any other suitable fuel (e.g., a gaseous nitrogen). As a non-limiting example, the third gaseous fuel could be methane, propane, butane, or any other gaseous hydrocarbon or non-hydrocarbon gas that when mixed with hydrogen or a hydrogen-containing fuel (e.g., the first gaseous fuel or the second gaseous fuel) produces a mixed fuel with lower flame propagation speed than hydrogen-containing fuel.

A third gaseous fuel supply line 142 can be fluidly coupled to the third fuel supply 106. The third gaseous fuel supply line 142 can refill or fill the third fuel supply 106. The third gaseous fuel supply line 142 can be fluidly coupled to an auxiliary tank including the third gaseous fuel. The auxiliary tank can be provided within the turbine engine 10, or exterior to the turbine engine 10. Alternatively, the third gaseous fuel supply line 142 can be fluidly coupled to a portion of the fuel supply system 100 that includes the third gaseous fuel such that when the third gaseous fuel is supplied to the fuel supply system 100, at least a portion of the third gaseous fuel is supplied back to the third fuel supply 106 after flowing through at least a portion of the fuel supply system 100.

A first valve 144 can be provided along a branch of the fuel supply system 100 that branches away from the combustion fuel flow that is to be directly supplied to the combustion section 114. The first valve 144 can be provided downstream of the accumulator 128 and upstream of the flow metering valve 130.

The branch of the fuel supply system 100 that the first valve 144 is provided on can be fluidly coupled to a prime fuel line 148. The first valve 144 can selectively fluidly couple a portion of the fuel supply system 100 to the prime fuel line 148 and can further ensure that a prime fuel flow within the prime fuel line 148 cannot flow through the first valve 144 away from the prime fuel line 148. The prime fuel line 148 can be fluidly coupled to a portion of the fuel supply system 100 that is upstream of second fuel pump 120 and downstream of the first check valve 115, and to a portion of the fuel supply system 100 that is downstream of the second fuel pump 120 and upstream of the second filter 122. A second valve 150 can selectively fluidly couple the prime fuel line 148 to the portion of the fuel supply system upstream of the second fuel pump 120 and downstream of the first check valve 115. A third valve can fluidly couple the prime fuel line 148 to a portion of the fuel supply system 100 downstream of the second fuel pump 120 and upstream of the second filter 122.

A purge fuel line 154 can be fluidly coupled to the prime fuel line 148 upstream of the second valve 150 and the third valve 152. The purge fuel line 154 can be fluidly coupled to at least one flow of purge gas. As a non-limiting example, purge fuel line 154 can be fluidly coupled to a first purge flow (F1) containing a first purge gas and a second purge flow (F2) containing second purge gas. The first purge gas and the second purge gas can be any stainable gas that can be supplied to the fuel supply system 100. As a non-limiting example, the first purge gas can be any suitable inert gas (e.g., nitrogen, helium, etc.), while the second purge gas can be a gaseous hydrogen with an equal or non-equal hydrogen content to the first gaseous fuel and the second gaseous fuel.

A second check valve 156 and a third check valve 158 biased against the first purge flow (F1) and the second purge flow (F2), respectively, can be provided along the purge fuel line 154. The second check valve 156 and the third check valve 158 can ensure that a combustion fuel flow cannot flow out of the purge fuel line 154 in a direction that is opposite the arrows of the first purge flow (F1) and the second purge flow (F2).

A purge fuel heater 160 can be provided along the purge fuel line 154 downstream of the second check valve 156 and the third check valve 158. The purge fuel heater 160 can heat the combustion fuel flow within the purge fuel line 154 before entering the prime fuel line 148.

A fourth valve 162 can selectively fluidly coupled the purge fuel line 154 to the prime fuel line 148. The fourth valve 162 can be provided downstream of the purge fuel heater 160.

At least a portion of the fuel supply system 100 can be provided within the turbine engine 10, while a remaining portion of the fuel supply system 100 can be provided exterior to the turbine engine 10. As a non-limiting example, at least the first fuel supply 102 along with the first fuel pump 112, the first filter 118, and the first check valve 115 can be provided exterior to the turbine engine (designated by arrow 164), while a remaining portion of the fuel supply system 100 can be provided within, or along the turbine engine (designated by arrow 166).

The fuel supply system 100 can further include a controller module 163 having a processor and a memory. The controller module 163 or processor can be operably or communicatively coupled to various portions of the fuel supply system 100 described herein and be configured to operate the various portions. As a non-limiting example, the controller module 163 can be sued to selectively control the operation (e.g., the opening, closing, startup, shutoff, etc.) of the first fuel pump 112, the second fuel pump 120, the heater 126, the purge fuel heater 160, the mixing valve 134, the flow metering valve 130, the shutoff valve 132, the first valve 144, the second valve 150, the third valve 152, or the fourth valve 162. Further, the controller module 163 can be configured to monitor one or more sensors throughout the fuel supply system 100 and operate the respective components of the fuel supply system 100 based on the readings from the one or more sensors. As a non-limiting example, the controller module 163 can be communicatively coupled to the flow transducer 124. The controller module 163, based on sensor readings from the flow transducer 124, can control various portions of the fuel supply system 100 (e.g., the first fuel pump 112 or the second fuel pump 120) to increase or decrease the mass flow rate of the flow of combustion fuel within the fuel supply system 100 to a desired mass flow rate. It is contemplated that various other portions of the fuel supply system 100 could be controlled via the controller module 163. As a non-limiting example, any number of the pressure release valves (e.g. the first pressure release valve 136 or the second pressure release valve 138) can be controlled via the controller module 163 such that the controller module 163 can open or close the respective pressure release valves.

The fuel supply system 100 includes an inlet line 190, a first outlet line 192, a second outlet line 194, and a gaseous fuel inlet line 196. The inlet line 190 defines an input to the heat exchanger 108. The inlet line 190 is configured to feed an input fluid to the heat exchanger 108. The first outlet line 192 fluidly couples the heat exchanger 108 to the combustion section 114. The second outlet line 194 fluidly couples the heat exchanger 108 to the second fuel supply 104. The second outlet line 194 defines a fluid input to the second fuel supply 104. The gaseous fuel inlet line 196 extends between the second fuel supply 104 and a portion of the first outlet line 192.

During operation, the fuel supply system 100 can supply the combustion fuel flow to the combustion section 114, where it is ultimately ignited, thereby generating the combustion gasses as described herein. As a non-limiting example, the combustion fuel flow can be supplied to a fuel injector or a set of fuel injectors provided within the combustion section, upstream of the combustor. The combustion fuel flow within the fuel supply system 100 can be dependent on the operation of the turbine engine 10. As a non-limiting example, the combustion fuel flow can change during startup, normal operation, and shutdown of the turbine engine 10.

During startup of the turbine engine 10, the combustion section 114 can be primed. The first fuel pump 112 can be turned off such that the liquid fuel does not flow through the fuel supply system 100. The second fuel pump 120, however, can be turned on, and the mixing valve 134, the first valve 144, and at least one of the second valve 150 or the third valve 152 can be opened such that the gaseous mixture of the first gaseous fuel and the third gaseous fuel flows through the prime fuel line 148, the heat exchanger 108, and ultimately into the combustion section 114. As a non-limiting example, the second fuel pump 120 can be driven by a motor that is electrically coupled to an accessory gear box or startup generator of the turbine engine 10. As such, the second fuel pump 120 can be started before combustion occurs within the combustion section (e.g., before full startup of the turbine engine 10). As this is during startup, the heat source 110 may not be of sufficient temperature to sufficiently heat up the combustion fuel flow within the heat exchanger 108. In other words, the heat source 110, during startup, is not sufficient to cause a phase change of the combustion fuel flow. The liquid fuel cannot be combusted, however, the first gaseous fuel, the second gaseous fuel, the third gaseous fuel or a combination thereof can. As such, during startup the combustion fuel flow is a gaseous fluid from the second fuel supply 104 and the third fuel supply 106. The phase change from liquid to gas is not needed in the heat exchanger 108. The heater 126, the accumulator 128, and the flow metering valve 130 can be selectively operated to bring the gaseous mixture to a desired temperature, pressure, and mass flow rate before entering the combustion section 114. The combustion fuel flow can then be fed to the combustion section 114 where it is combusted, which ultimately starts the rotation of a turbine section downstream of the combustion section 114 and the full startup of the turbine engine 10. Flame propagation speed of pure gaseous hydrogen is very high compared to other fuels and could result in an unsuccessful combustion upon startup (e.g., the turbine engine may not startup properly if purge hydrogen is used during the startup process). As such, it is contemplated that reducing the flame propagation speed by mixing hydrogen fuels with other fuels (e.g., propane, methane, nitrogen, etc. from the third fuel supply 106) can result in a more controlled combustion within the combustion section 114 that always results in a successful startup of the turbine engine.

During normal operation of the turbine engine 10 (e.g., after startup and before shutdown), the purge fuel line 154 can be closed (e.g., the first valve 144, second valve 150, and third valve 152 are closed) and the first fuel pump 112 is turned on. As such, the liquid fuel from the first fuel supply 102 can flow through the fuel supply system 100 and into the heat exchanger 108. As the turbine engine 10 is now started, the heat source 110 is sufficient to induce a phase change of the liquid fuel to the second gaseous fuel. The heat exchanger 108 can at least partially bring the combustion fuel flow to a desired pressure and temperature, however, the main purpose of the heat exchanger 108 is to bring the combustion fuel flow to a desired phase (e.g., gaseous). The heater 126, the accumulator 128, and the flow metering valve 130 can be selectively operated to bring the second gaseous fuel to a desired temperature, pressure, and mass flow rate before entering the combustion section 114. It is further contemplated that the mixing valve 134 can be opened during this phase such that the gaseous mixture of the first gaseous fuel and the third gaseous fuel merges with the second gaseous fuel prior to entering the combustion section 114. This can be used to further control the temperature and pressure of the combustion fuel flow entering the combustion section 114. The combustion fuel flow, defined by the second gaseous fuel, can then flow into the combustion section 114 where it is ultimately combusted to generate the combustion gases and drive the turbine engine 10.

As the second gaseous fuel and the third gaseous fuel were used to prime the combustion section 114 during startup, the second fuel supply 104 and the third fuel supply 106 can be at least partially depleted. At least a portion of the second gaseous fuel can be supplied to the second fuel supply 104 through the first pressure release valve 136. As such, the second gaseous fuel can at least partially refill the second fuel supply 104. The third fuel supply 106 can be at least partially refilled through the third gaseous fuel supply line 142.

During shutdown of the turbine engine 10, the first fuel pump 112 can be shutoff such that the liquid fuel is not supplied to the heat exchanger 108. At least one of the second valve 150 or the third valve 152 can be opened, and the fourth valve 162 can be opened such the purge gas (e.g., from at least one of the first purge flow (F1), or the second purge flow (F2)), is supplied through the purge fuel line 154 and into the prime fuel line 148. The purge fuel heater 160 can heat the purge gas to a desired temperature prior to it entering the prime fuel line 148. The shutoff valve 132 can be closed such that the combustion fuel flow does not enter the combustion section 114 and instead circulates through the fuel supply system 100 until the residue is all picked up. After a desired amount of time, the shutoff valve 132 can be reopened and the purge gas can be fed the combustion section 114 and ultimately exhausted to atmosphere through the exhaust section. This procedure of supplying the purge gas to the fuel supply system 100 can be used to purge the fuel supply system 100 of any lingering gasses or liquids that are not desired to have sit in the fuel supply system 100 (e.g., within the heat exchanger 108) when the turbine engine 10 is shutdown.

Figure 3:
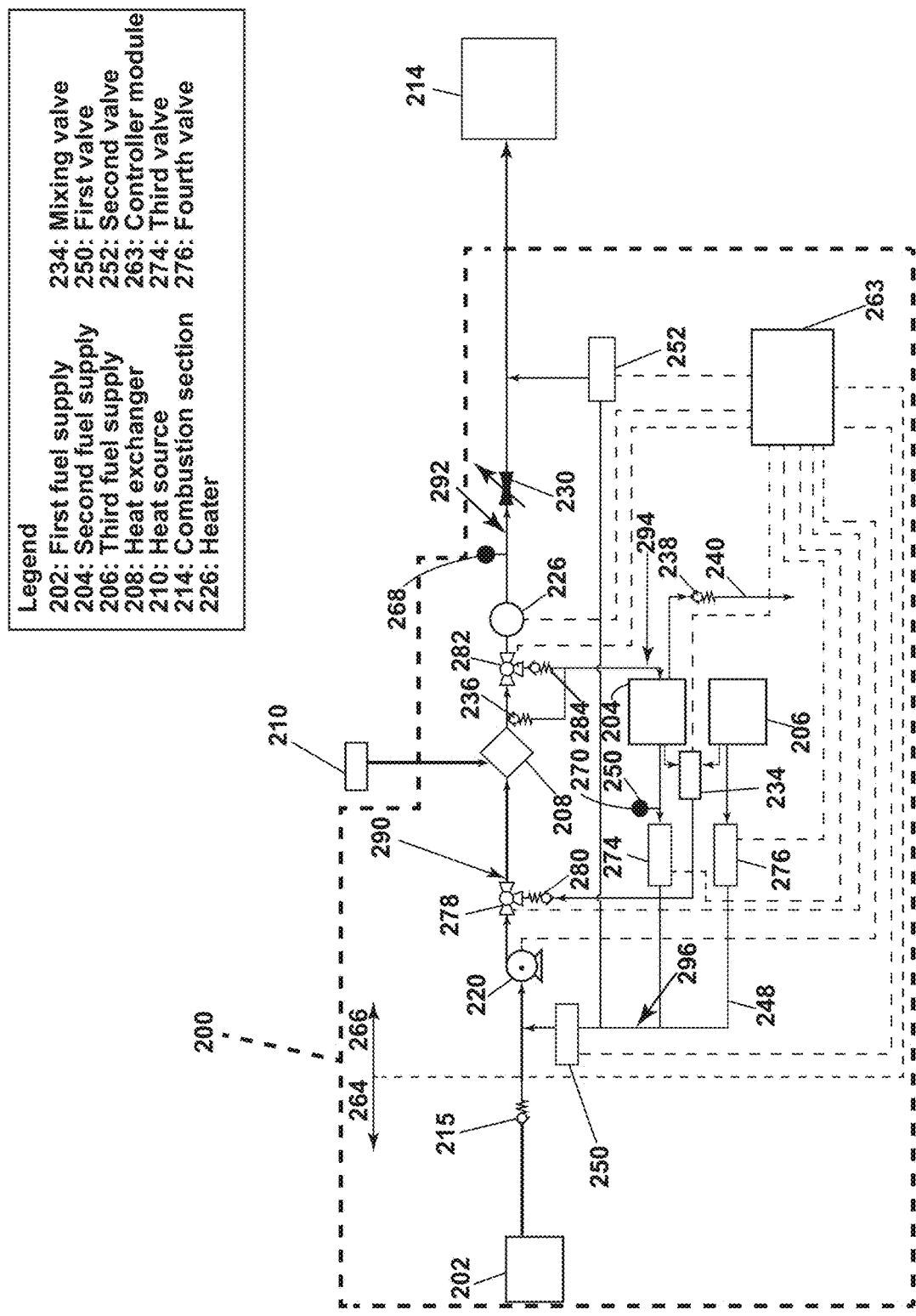
FIG. 3 is a schematic representation of an exemplary fuel supply system suitable for use as a fuel supply for the combustion section of FIG. 1, the exemplary fuel supply system having an exemplary first fuel supply and an exemplary second fuel supply.

FIG. 3 is a schematic representation of an exemplary fuel supply system 200 suitable for use as a fuel supply for a generic combustion section 214 such as the combustion section 14 of FIG. 1. The fuel supply system 200 is similar to the fuel supply system 100, therefore, like parts will be identified with like numerals increased to the 200 series, with it being understood that the description of the like parts of the fuel supply system 100 applies to the fuel supply system 200 unless otherwise noted. It will be further appreciated that the fuel supply system 100 can include any suitable portions of the fuel supply system 200, and vice-versa.

The fuel supply system 200 can include a first fuel supply 202 having a liquid fuel, a second fuel supply 204 having a first gaseous fuel, and a third fuel supply 206 having a third gaseous fuel. A heat exchanger 208 can be provided downstream of the second fuel supply 204 and be fluidly coupled to a heat source 210 (e.g., a heat source of the turbine engine 10 (FIG. 1). A first check valve 215 can be provided downstream of the first fuel supply 102 and be biased against a combustion fuel flow from the second fuel supply 204. A fuel pump 220 can be provided downstream of the first check valve 215 and pump the combustion fuel flow within the fuel supply system 200. A heater 226, and a flow metering valve 230 can be provided downstream of the heat exchanger 208 and be configured to control the heat, pressure, and mass flow rate, respectively, of the combustion fuel flow. A mixing valve 234 can fluidly couple the second fuel supply 204 and the third fuel supply 206 to define a gaseous mixture of the two, which can be supplied the fuel supply system 200. A first pressure release valve 236 can be provided downstream of the heat exchanger 208 and fluidly couple a downstream portion of the heat exchanger 208 or a portion of the fuel supply system 200 downstream of the heat exchanger 208 to the second fuel supply 204. A second pressure release valve 238 can be fluidly coupled to the second fuel supply 204 and an exhaust fluid flow 240. A prime fuel line 248 can be fluidly coupled to the fuel supply system 100. A first valve 250 and a second valve 252 can selectively fluidly couple the prime fuel line 248 to a remainder of the fuel supply system 200. At least a portion of the fuel supply system 200 (e.g., the first fuel supply 202, or the first check valve 215) can be provided exterior the turbine engine (designated by arrow 264), while a remaining portion of the fuel supply system 200 can be provided within or along the turbine engine (designated by arrow 266). The fuel supply system 200 includes an inlet line 290, a first outlet line 292, a second outlet line 294, and a gaseous fuel inlet line 296. The inlet line 290 defines an input to the heat exchanger 208. The inlet line 290 is configured to feed an input fluid to the heat exchanger 208. The first outlet line 292 fluidly couples the heat exchanger 208 to the combustion section 214. The second outlet line 294 fluidly couples the heat exchanger 208 to the second fuel supply 204. The second outlet line 294 defines a fluid input to the second fuel supply 204. The gaseous fuel inlet line 296 extends between the second fuel supply 204 and a portion of the inlet line 290.

Similar to the fuel supply system 100, the fuel supply system 200 can include a combustion fuel flow that can change based on the operational state of the turbine engine. As a non-limiting example, during startup, the first gaseous fuel, the third gaseous fuel, or a combination thereof can be supplied to the combustion section 214 and ignited, thereby starting the engine. During normal operation (e.g., after startup), the liquid fuel can be supplied to the heat exchanger where a phase change from liquid to gas occurs (e.g., the second gaseous fuel). The second gaseous fuel can be supplied to the combustion section 114 and ignited. At least a portion of the second gaseous fuel can be supplied to the second fuel supply 204 to refill the second fuel supply 204. During shutdown, the first gaseous fuel, the third gaseous fuel, or a combination thereof can define the combustion fuel flow and purge the fuel supply system 200 of any residual combustion fuel flow.

The fuel supply system 200 can include any suitable sensor provided along the fuel supply system 200 configured to measure or otherwise sense at least one parameter related to the combustion fuel flow. As a non-limiting example, the fuel supply system 200 can include a first temperature sensor 268, downstream of the heater 226, which can measure or sense the temperature of the combustion fuel flow. It will be appreciated, however, that any number of temperature sensors can be provided along any suitable portion of the fuel supply system 200 to measure the temperature of the combustion fuel flow at a respective portion of the fuel supply system 200. As a non-limiting example, a second temperature sensor 270 can be provided downstream of the second fuel supply 204. It will be further appreciated that the fuel supply system 200 can include any other suitable sensor such as, but not limited to, a mass flow rate sensor (e.g., the flow transducer 124 of the fuel supply system 100), a pressure sensor, the first temperature sensor 268, the second temperature sensor 270, or any combination thereof.

The first check valve 215 can be similar to the first check valve 115, except that the first check valve 215 can be a pressure release valve that is a spring check valve. The first check valve 215 can allow the liquid fuel to flow through the first check valve 215 when the liquid fuel is at or above a predetermined pressure.

The prime fuel line 248 is similar to the prime fuel line 148, except that the locations where the prime fuel line 248 is fluidly coupled to a remainder of the fuel supply system 200 is different. The prime fuel line 248 can be selectively fluidly coupled, by selective operation of the first valve 250, to a portion of the fuel supply system 200 upstream of the fuel pump 220 and downstream of the first check valve 215, like the prime fuel line 148. The prime fuel line 248, however, can further be selectively fluidly coupled, by selective operation of the second valve 252, coupled to a portion of the fuel supply system 200 downstream of the flow metering valve 230. Further, the prime fuel line 248 can include a more controlled gaseous mixture of the first gaseous fuel and the third gaseous fuel when compared to the prime fuel line 148. The ratio of the first gaseous fuel and the third gaseous fuel within the prime fuel line 248 can be controlled by a third valve 274 fluidly coupled to the second fuel supply 204 and a fourth valve 276 fluidly coupled to the third fuel supply 206.

The mixing valve 234 is similar to the mixing valve 134, except the mixing valve 234 is selectively fluidly coupled to a portion of the fuel supply system 200 upstream of the heat exchanger 208. As a non-limiting example, the mixing valve 234 is selectively fluidly coupled, by a first diverter valve 278, to a portion of the fuel supply system 200 downstream of the fuel pump 220. A second pressure release valve 280 in the form of a spring check valve can be biased against a combustion fuel flow from the first diverter valve 278. The mixing valve 234, the first diverter valve 278 and the second pressure release valve 280 can be defined as a portion of the prime fuel line 248.

A second diverter valve 282 can be provided downstream of the heat exchanger 208 and be fluidly coupled to the second fuel supply 204. A third pressure release valve 284 can be provided downstream of the second diverter valve 282 and upstream of the second fuel supply 204 and be biased against a combustion fuel flow from the second fuel supply 204. The portions of the fuel supply system 200 that the first pressure release valve 236 and the third pressure release valve 284 can be provided on a portion of the fuel supply system 200 that at least partially refills the second fuel supply 204 with the second gaseous fuel. As the second diverter valve 282 is selectively operable, more of less second gaseous fuel can be supplied to the second fuel supply 204 dependent on the fuel level of the second fuel supply 204. As a non-limiting example, the second diverter valve 282 can be switched to provide the combustion fuel flow to the second fuel supply alongside the combustion fuel flow flowing through the first pressure release valve 236 when it is determined that the second fuel supply 204 needs refilling and the combustion fuel flow through the first pressure release valve 236 would not be enough on its own. Alternatively, the first pressure release valve 236 and the third pressure release valve 284 can be rated at different pressures. As a non-limiting example, the third pressure release valve 284 can have a lower pressure rating than the first pressure release valve 236. In cases where the combustion fuel flow is not sufficient to pass through the first pressure release valve 236 but is sufficient to pass through the third pressure release valve 284 and the second fuel supply 204 needs refilling, the second diverter valve 282 can be switched to direct at least a portion of the combustion fuel flow toward the second fuel supply 204.

A controller module 263, similar to the controller module 163, can be provided to selectively control operation of any suitable portion of the fuel supply system 200. As a non-limiting example, the controller module 263 can selectively operate the first fuel pump 220, the heater 226, the mixing valve 234, the flow metering valve 230, the first valve 250, the second valve 252, the third valve 274, the fourth valve 276, the first diverter valve 278, or the second diverter valve 282. Further, the controller module 263 can be configured to monitor one or more sensors throughout the fuel supply system 200 and operate the respective components of the fuel supply system 200 based on the readings from the one or more sensors. As a non-limiting example, the controller module 263 can be communicatively coupled to the first temperature sensor 268, or the second temperature sensor 270. The controller module 263, based on sensor readings from the temperature sensor 268, can control the heater 226 to ensure that the combustion fuel flow is of the proper temperate prior to entering the combustion section 214.

During startup, the heater 226 can be turned on and the flow metering valve 230, the first valve 250, the second valve 252, and at least one of the third valve 274 or the fourth valve 276 can be at east partially opened/operated by the controller module. The opening of the first valve 250, second valve 252, third valve 274, and fourth valve 276 can permit a first prime gas containing at least the first gaseous fluid, the third gaseous fluid, or a mixture thereof to enter the fuel supply system 200. The mixing valve 234 and the first diverter valve 278 can further be opened to permit a second prime gas containing a mixture of the first gaseous fuel and the third gaseous fuel to enter the fuel supply system 200. The fuel pump 220 can be turned on to permit the combustion fuel flow through the fuel supply system. The combustion fuel flow during startup can be defined as a fluid without the liquid fuel. At least a portion of the combustion fuel flow can flow through heater 226, the flow metering valve 230, and ultimately into the combustion section 214. The heater 226 can at least partially heat the combustion fuel flow such that the combustion fuel flow is at a desired temperature before entering the combustion section 214. The flow metering valve 230 can pressurize and restrict the combustion fuel flow. As such, the pressure, velocity, heat, and mass-flow rate of the combustion fuel flow entering the combustion section during startup can be controlled to be at the desired parameters for combustion to occur once ignited.

During shutdown, the heater 226 and flow metering valve 230 can be turned off or closed. The first valve 250, the second valve 252, and the third valve 274 can all be opened. The fuel pump 220 can be reduced to an idle speed such that first gaseous fuel is pumped through the fuel supply system 200. This can be done until the temperature of the combustion fuel flow is below a liquid saturation temperature of the third gaseous fuel. Once that occurs, the flow metering valve 230 can be opened and the second valve 252, and the third valve 274 can be closed. The fourth valve 276 can be opened and the system can be purged with the third gaseous fuel, which can then enter the combustion section 214 and ultimately out of the exhaust section.

Benefits of the present disclosure include a fuel supply system containing a combustion fuel flow with a hydrogen-containing fuel. Hydrogen-containing fuel, when compared to conventional fuel, has less of an environmental impact without sacrificing engine performance. The exhaust gasses generated as a byproduct of combustion of the hydrogen-containing fuel (e.g., low or zero carbon fuels) contain less pollutant chemicals and particulate matter that are harmful to the environment when compared to the combustion of traditional fuels. Combustion of hydrogen-containing fuel, however, has in a higher flame temperature than traditional fuels. That is, hydrogen or a hydrogen mixed fuel typically has a wider flammable range and a faster burning velocity than traditional fuels such petroleum-based fuels, or petroleum and synthetic fuel blends. Therefore, the many of the combustion components designed for traditional fuels would not be suitable for hydrogen or hydrogen mixed fuels. For example, a conventional fuel supply system would not be suitable as a fuel supply system containing a hydrogen-containing fuel. The conventional fuel supply system would not be able to bring the hydrogen-containing fuel to the needed temperature, pressure, phase, mass-flow rate, or velocity prior to it entering the combustion chamber in order for the desired combustion to occur. The fuel supply system, as described herein, however, includes various components that can be used to control the pressure, temperature, velocity, or mass flow rate (e.g., the heaters, mixing valve, heat exchanger, accumulator, hydraulic circuit, flow metering valve, first fuel pump, or second fuel pump, as described herein). These components can ultimately result in a combustion fuel flow into the combustion section that is at a desired pressure, temperature, velocity and mass flow rate for a hydrogen-containing fuel, thus resulting in the desired, controlled combustion within the combustion chamber. This control would not be possible with the conventional fuel supply system.

Further benefits of the present disclosure include a more efficient fuel supply system when compared to a conventional fuel supply system. For example, the conventional fuel supply systems can include a heat exchanger to heat the combustion fuel flow within the fuel supply system prior to it entering the combustion section. The heat exchanger, however, is thermally coupled to a . . . . The fuel supply system, as described herein, however, includes the heat exchanger that is thermally coupled to an existing engine heat source (e.g., the exhaust gasses within the exhaust section). In a fuel supply system for a conventional turbine engine (e.g., one with traditional fuels), the heat of the exhaust gasses would not be enough to change cryogenically frozen liquid hydrogen to a gaseous state. However, as the turbine engine as described herein uses a hydrogen-containing fuel, which has a higher flame temperature than traditional fuels, the exhaust gases are also hotter. As such, the exhaust gasses can be channeled back into the turbine engine and thermally coupled to the heat exchanger to produce the phase change from liquid to gas. As such, the turbine engine is a more efficient turbine engine when compared to conventional turbine engines.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A fuel supply system selectively fluidly coupled to and defining a fuel source for a combustion section of a turbine engine having at least one heat source, the fuel supply system comprising a first fuel supply having a liquid fuel, a second fuel supply having a first gaseous fuel, and a heat exchanger fluidly coupled to the first fuel supply and thermally coupled to the at least one heat source, the heat exchanger producing heat sufficient to change the liquid fuel to a second gaseous fuel that is the same type of fuel as the first gaseous fuel, wherein the first fuel supply and the second fuel supply are separately selectively fluidly coupled to the combustion section.

The fuel supply system of any preceding clause, further comprising a third fuel supply having a third gaseous fuel different from the first gaseous fuel and the second gaseous fuel.

The fuel supply system of any preceding clause, further comprising a mixing valve fluidly coupled to the second fuel supply and the third fuel supply and configured to output a mixture of the first gaseous fuel and the third gaseous fuel.

The fuel supply system of any preceding clause, wherein the mixing valve is selectively fluidly coupled to the combustion section of the turbine engine.

The fuel supply system of any preceding clause, wherein the mixture is supplied to the combustion section upon startup of the turbine engine.

The fuel supply system of any preceding clause, wherein the third gaseous fuel includes one of a gaseous nitrogen, a methane, a propane, or a butane, the liquid fuel includes a liquid hydrogen and the first gaseous fuel includes a gaseous hydrogen.

The fuel supply system of any preceding clause, wherein the liquid fuel includes a liquid hydrogen and the first gaseous fuel has a gaseous hydrogen.

The fuel supply system of any preceding clause, wherein the first gaseous fuel has a first gaseous hydrogen content, and the second gaseous fuel has a second gaseous hydrogen content that is the same as the first gaseous hydrogen content.

The fuel supply system of any preceding clause, further comprising a prime fuel line that fluidly couples the second fuel supply to a portion of the fuel supply system upstream of the heat exchanger.

The fuel supply system of any preceding clause, wherein the prime fuel line supplies a flow of the first gaseous fuel to the heat exchanger prior to the liquid fuel being supplied to the heat exchanger.

The fuel supply system of any preceding clause, further comprising a fuel pump provided upstream of the heat exchanger and downstream of the first fuel supply, wherein the prime fuel line is selectively fluidly coupled to a portion of the fuel supply system downstream of the fuel pump.

The fuel supply system of any preceding clause, wherein the prime fuel line is selectively fluidly coupled to a portion of the fuel supply system upstream of the fuel pump.

The fuel supply system of any preceding clause, further comprising a diverter valve fluidly coupled to the prime fuel line and provided along the portion of the fuel supply system downstream of the fuel pump.

The fuel supply system of any preceding clause, wherein the prime fuel line is fluidly coupled to a portion of the fuel supply system downstream of the heat exchanger.

The fuel supply system of any preceding clause, further comprising a third fuel supply selectively fluidly coupled to the prime fuel line and containing a third gaseous fuel different from the first gaseous fuel and the second gaseous fuel.

The fuel supply system of any preceding clause, further comprising a purge fuel line selectively fluidly coupled to a purge gas and the prime fuel line, wherein the purge gas can be fed through the prime fuel line during shutdown of the turbine engine.

The fuel supply system of any preceding clause, wherein the second gaseous fuel can be selectively supplied to the second fuel supply such that the second fuel supply can contain a gaseous mixture including at least one of the first gaseous fuel and the second gaseous fuel.

The fuel supply system of any preceding clause, further comprising a pressure release valve that can exhaust the gaseous mixture exterior to the second fuel supply when the gaseous mixture exceeds a threshold pressure value.

The fuel supply system of any preceding clause, wherein the heat source of the turbine engine is an exhaust airflow.

The fuel supply system of any preceding clause, wherein the first fluid supply is provided exterior the turbine engine and the heat exchanger is provided within an interior of the turbine engine.

What is claimed is:

1. A fuel supply system selectively fluidly coupled to, and defining a fuel source for, a combustion section of a turbine engine, the turbine engine having at least one heat source, the fuel supply system comprising:
   a first fuel supply having a liquid fuel;
   a second fuel supply having a first gaseous fuel;
   a heat exchanger fluidly coupled to the first fuel supply and thermally coupled to the at least one heat source, the heat exchanger configured to produce a heat sufficient to change the liquid fuel to a second gaseous fuel;
   a first outlet line extending from the heat exchanger and fluidly coupling the heat exchanger to the combustion section;
   a second outlet line, separate from the first outlet line, extending from the heat exchanger and fluidly coupling the heat exchanger to the second fuel supply and defining a fluid input to the second fuel supply; and
   a gaseous fuel inlet line extending from the second fuel supply to a portion of the first outlet line that is downstream of the heat exchanger and upstream of a portion of the combustion section, the gaseous fuel inlet line defining a gaseous fuel input of the first gaseous fuel to the first outlet line.

2. The fuel supply system of claim 1, further comprising at least one of a heater, an accumulator, a flow metering valve, or a shutoff valve provided along the first outlet line.

3. The fuel supply system of claim 1, further comprising a third fuel supply having a third gaseous fuel, wherein the gaseous fuel inlet line extends from the third fuel supply to the first outlet line, the gaseous fuel input to the first outlet line being at least one of the first gaseous fuel or the third gaseous fuel.

4. The fuel supply system of claim 1, further comprising an exhaust line extending from the second fuel supply and exhausting to at least one of downstream of the combustion section of the turbine engine or exterior of the turbine engine.

5. The fuel supply system of claim 1, further comprising a pressure release valve provided on the second outlet line, the pressure release valve exhausting the second gaseous fuel into the second fuel supply when the second gaseous fuel exceeds a threshold pressure.

6. A fuel supply system selectively fluidly coupled to, and defining a fuel source for, a combustion section of a turbine engine, the turbine engine having at least one heat source, the fuel supply system comprising:
   a first fuel supply having a liquid fuel, the first fuel supply being provided within a first housing;
   a second fuel supply having a first gaseous fuel, the second fuel supply being provided within a second housing, separate from the first housing;
   a heat exchanger fluidly coupled to the first fuel supply and thermally coupled to the at least one heat source, the heat exchanger configured to produce a heat sufficient to change the liquid fuel to a second gaseous fuel;
   a third fuel supply having a third gaseous fuel different from the first gaseous fuel and the second gaseous fuel; and
   a mixing valve fluidly coupled to the second fuel supply and the third fuel supply and configured to output a mixture of the first gaseous fuel and the third gaseous fuel;
   wherein the first fuel supply and the second fuel supply are separately selectively fluidly coupled to the combustion section.

7. The fuel supply system of claim 6, wherein the third gaseous fuel includes one of a gaseous nitrogen, a methane, a propane, or a butane, the liquid fuel includes a liquid hydrogen and the first gaseous fuel includes a gaseous hydrogen.

8. The fuel supply system of claim 6, wherein the liquid fuel includes a liquid hydrogen and the first gaseous fuel has a gaseous hydrogen.

9. The fuel supply system of claim 6, wherein the first gaseous fuel has a first gaseous hydrogen content, and the second gaseous fuel has a second gaseous hydrogen content that is the same as the first gaseous hydrogen content.

10. The fuel supply system of claim 6, further comprising a prime fuel line extending between the second fuel supply and a portion of the fuel supply system upstream of the heat exchanger.

11. The fuel supply system of claim 10, wherein the prime fuel line supplies a flow of the first gaseous fuel to the heat exchanger prior to the liquid fuel being supplied to the heat exchanger.

12. The fuel supply system of claim 10, further comprising a fuel pump provided upstream of the heat exchanger and downstream of the first fuel supply, wherein the prime fuel line extends from the second fuel supply to a portion of the fuel supply system downstream of the fuel pump.

13. The fuel supply system of claim 12, wherein the prime fuel line is selectively fluidly coupled to a portion of the fuel supply system upstream of the fuel pump.

14. The fuel supply system of claim 10, wherein a portion of the prime fuel line extends from a portion of the fuel supply system downstream of the heat exchanger.

15. The fuel supply system of claim 10, further comprising a purge fuel line defining a fluid input of a purge gas to the prime fuel line, wherein the purge gas is fed through the prime fuel line during shutdown of the turbine engine.

16. The fuel supply system of claim 6, wherein the heat source of the turbine engine is a portion of the turbine engine downstream of the combustion section.

17. The fuel supply system of claim 6, wherein the first fuel supply is provided exterior the turbine engine and the heat exchanger is provided within an interior of the turbine engine.

18. A fuel supply system selectively fluidly coupled to, and defining a fuel source for, a combustion section of a turbine engine, the turbine engine having at least one heat source, the fuel supply system comprising:
  a first fuel supply having a liquid fuel, the first fuel supply being provided within a first housing;
  a second fuel supply having a first gaseous fuel, the second fuel supply being provided within a second housing, separate from the first housing;
  a heat exchanger fluidly coupled to the first fuel supply and the at least one heat source, the heat exchanger configured to produce a heat sufficient to change the liquid fuel to a second gaseous fuel;
  an inlet line defining an input to the heat exchanger, the inlet line configured to feed an input fluid to the heat exchanger;
  a first outlet line fluidly coupling the heat exchanger to the combustion section;
  a second outlet line fluidly coupling the heat exchanger to the second fuel supply, the inlet line defining a fluid inlet to the second fuel supply;
  a gaseous fuel inlet line extending between the second fuel supply and a portion of the inlet line that is upstream of the heat exchanger and downstream of the first fuel supply, the gaseous fuel inlet line defining a gaseous fuel output from the second fuel supply and a gaseous fuel input to the inlet line; and
  a controller module having a processor and a memory, the memory having instructions stored thereon which, when executed by the processor, cause the controller module to selectively operate one or more components of the fuel supply system such that:
    during startup of the turbine engine, the first gaseous fuel flows through the gaseous fuel inlet line and is fed to the combustion section, and the liquid fuel does not flow through the fuel supply system; and
    after startup of the turbine engine and when the heat exchanger produces the heat sufficient to change the liquid fuel to the second gaseous fuel, the liquid fuel is fed to the heat exchanger to change the liquid fuel into the second gaseous fuel.

19. The fuel supply system of claim 18, further comprising at least one of a heater, an accumulator, a flow metering valve, or a shutoff valve provided along the first outlet line.

20. The fuel supply system of claim 18, further comprising a third fuel supply having a third gaseous fuel, wherein the gaseous fuel inlet line extends from the third fuel supply to the inlet line, the gaseous fuel input being at least one of the first gaseous fuel or the third gaseous fuel.

* * * * *